United States Patent Office 2,792,419
Patented May 14, 1957

2,792,419

BENZOIC ACID PRODUCTION

James V. Smith, Bartlesville, Okla., assignor to Phillips Petroleum Company, a corporation of Delaware No Drawing. Application January 5, 1953,
Serial No. 329,720

13 Claims. (Cl. 260—523)

This invention relates to the production of benzoic acid. In one of its more specific aspects, it relates to the production of benzoic acid from mono-alkyl and mono-alkenyl substituted cyclohexenes. In another of its more specific aspects, it relates to the production of benzoic acid by the catalytic dehydrogenation and oxidation of mono-alkyl and mono-alkenyl substituted cyclohexenes.

It has previously been known to produce benzoic acid by the oxidation of aromatic hydrocarbons, such as toluene. It has also been known to produce benzoic acid on a commercial scale by the hydrogenolysis of benzotrichloride and the partial decarboxylation of phthalic acid. Such processes have, however, been dependent upon aromatic hydrocarbons as the source of starting materials. As is well known, such aromatics are often in short supply.

I have now discovered a process for the production of benzoic acid in high yields from materials which are readily available and inexpensive. Mono-alkyl or mono-alkenyl substituted cyclohexenes are the starting material for my process. 4-vinyl-1-cyclohexene is particularly desirable as a starting material for this process, for such material is available in good supply as a by-product from the conversion of butane to butadiene. My process is all the more attractive since maleic acid is usually produced as a valuable and useful product.

The following objects of the invention will be attained by the aspects of this invention.

An object of this invention is to provide an improved process for the production of benzoic acid. Another object of the invention is to provide a novel process for the production of benzoic acid from readily available materials such as mono-alkyl or mono-alkenyl substituted cyclohexenes. Another object of this invention is to provide a novel process for the production of benzoic acid from readily available materials such as vinylcyclohexenes. Another object of this invention is to provide a continuous process for the catalytic dehydrogenation and oxidation of mono-alkyl or mono-alkenyl substituted cyclohexenes to carboxylic acids. Other and further objects of this invention will be apparent to those skilled in the art upon study of this disclosure.

The cyclohexenes employed as starting materials in the present process are well known chemical compounds. Straight or branched chain mono-alkyl or mono-alkenyl substituted cyclohexenes, wherein the substituent contains from 1 to 6 carbon atoms and is preferably attached to a carbon atom not attached to a double bond in the ring, are useful as starting materials in the process of this invention. Specific substituents of the cyclohexenes used in my invention include methyl; ethyl; n-propyl; isopropyl; n-butyl; isobutyl; tert-butyl; n-amyl; 2-methylbutyl; 3-methylbutyl; n-hexyl; 2,3-dimethylbutyl; 3-methylpentyl; 2-ethylbutyl; 1-methylpentyl; 2-ethylbutyl; 1-methylphentyl; 1,3-dimethylbutyl; vinyl; α-methylvinyl; 1-propenyl; 2-butenyl; 2-methyl-3-butenyl; 1-methyl-2-pentenyl; 2-methyl-3-pentenyl; 2-ethyl-1-butenyl; 1-butenyl; 1-hexenyl; 2-hexenyl.

Broadly speaking this invention comprises charging a mono-alkyl or mono-alkenyl substituted cyclohexene, such as 4-vinyl-1-cyclohexene or one of the cyclohexenes substituted as described above, in admixture with oxygen or oxygen-containing gas at a controlled rate to a heated reaction zone containing a catalyst, under vapor phase conditions. The products are recovered by suitable means such as by condensation on a cooled surface or by passing the exit gas stream from the reaction zone to a water washing zone where benzoic acid forms as crystals due to its low solubility. The crystalline benzoic acid can be recovered by filtration or the like. In the washing zone, the maleic anhydride is hydrolyzed to maleic acid and can be recovered by evaporation of the aqueous solution or by other suitable means, such as by precipitation as an insoluble metal salt, such as the barium salt.

Catalysts suitable for use in the present process include the vanadium and molybdenum types and combination vanadium-molybdenum catalysts. In some instances certain other oxidation catalysts known in the art can be used. The catalyst can be employed with or without a support, such as silica gel or the like. When used without a support, the catalyst will preferably be pelleted to suitable size to facilitate flow of the feed stream through the catalyst bed.

One suitable catalyst which I have found to be particularly advantageous for use in the present process consists of tin vanadate in admixture with molybdenum oxide and titanium oxide. Oxalic acid is used in preparing the catalyst, but this serves primarily as a binder, since it is removed at the temperatures employed in the process. This catalyst is preferably supported on a granular inert carrier, such as an artificial filter stone of a fineness of about 4-8 mesh. A typical mixture for preparing the catalyst will contain 3.6 grams of tin vanadate ($Sn(VO_3)_4$), 20 grams of molybdenum oxide, 10 grams of titanium oxide, 10 grams of oxalic acid, 100 cc. of silica gel and 100 cc. of water. Other binders and carriers can be used. This mixture is evaporated to dryness with stirring, and may then be ignited in the catalyst tube in a stream of air at a temperature of about 650° F. to 1500° F. prior to initiating the oxidation reaction.

Other catalysts which are satisfactory for operation of the process of this invention include molybdenum trioxide, molybdenum disulfide, tin vanadate, vanadium oxides, such as vanadium pentoxide, admixtures of such catalysts, and the like.

The amount of oxygen employed in the feed stream is generally in the range from 1 to 100, preferably 10 to 75 volumes of oxygen per gaseous volume of starting material. Larger amounts of oxygen can be employed if desired. The ratio of oxygen to starting material is preferably maintained outside of explosive limits for the specific hydrocarbon employed. When water vapor is employed in the feed for improving temperature control of the reaction, an amount of water vapor in the range from 5 to 20 volume percent of the feed stream is maintained. Between 8 and 15 volume percent of the feed stream is preferably comprised of water vapor.

Pressures slightly above atmospheric and higher can be employed in the present process. I prefer to employ pressures approximately 20 to 50 millimeters of mercury above atmospheric and generally not in excess of two atmospheres absolute. Temperatures of reaction are maintained in the range from 400° F. to 1000° F., preferably from 550° F. to 850° F. The feed stream is charged to the catalyst zone at a rate of 800 to 2000, preferably 100 to 1650 volumes of gaseous feed per volume of catalyst per hour.

The following examples exemplify, but should not be construed to unduly limit the invention.

Example 4-vinyl-1-cyclohexene was converted to benzoic acid by passing a vaporous feed consisting of 4-vinyl-1-cyclohexene, air and water vapor over 500 cc. of molybdenum oxide-titanium dioxide-tin vanadate on silica gel catalyst,[1] said catalyst being heated and maintained at a temperature of 728° F. to 746° F. Conditions of operation and other data for two runs are set forth below:

|  | Run #1 | Run #2 |
|---|---|---|
| Charge: |  |  |
| 4-vinyl-1-cyclohexene, Volume percent, vapor phase | 0.33 | 0.37 |
| Air, Volume percent | 84.5 | 88.23 |
| Water vapor, volume percent | 15.17 | 11.4 |
| Space Velocity, volumes of vapor feed per volume catalyst per hour | 1,584 | 1,531 |
| Temperature, Bath °F | 650–662 | 665–692 |
| Temperature, Hot spot on catalyst °F | 728–746 | 751–791 |
| Duration of run, hours | 4.25 | 5.75 |
| Total 4-vinyl-1-cyclohexene charged; grams | 10.8 | 15.65 |
| Yield of benzoic acid, based on 4-vinyl-1-cyclohexene charged weight percent | 26.0 | (*) |
| Yield of maleic acid, based on 4-vinyl-1-cyclohexene charged weight percent | 38.0 | 41.7 |

*Not determined.

The product was recovered by passing the effluent gas stream through a water wash. The insoluble benzoic acid was recovered by filtration. The maleic acid product was recovered by precipitation as barium maleate.

Identification of benzoic acid was determined on the product prepared in run No. 2. This product had a melting point of 252° F. (literature 252° F.) and a mixed melting point of 252° F. Benzoic acid was further identified by means of the p-bromo phenacyl bromide derivative which had a melting point of 246° F. (literature value 246° F.) and its neutralization equivalent of 119.5 (literature value 122).

Maleic acid product was recovered and identified as the barium salt.

Various modifications of this invention will be apparent to those skilled in the art upon study of the accompanying disclosure. Such modifications are believed to be within the spirit and scope of this invention.

I claim:

1. A process for the conversion of hydrocarbons to benzoic acid which comprises subjecting a hydrocarbon feed selected from the group consisting of mono-alkyl and mono-alkenyl substituted cyclohexenes, wherein the substituent contains from 1 to 6 carbon atoms and is attached to a carbon atom not attached to double bond in the ring, to contact with a catalyst selected from the group consisting of molybdenum trioxide, molybdenum disulfide, tin vanadate, vanadium pentoxide, mixtures thereof, and an admixture of tin vanadate, molybdenum oxide and titanium oxide at a temperature in the range of 400 F. to 1000 F. with sufficient oxygen to effect conversion of the hydrocarbon feed and recovering benzoic acid as a reaction product.

2. The process according to claim 1 wherein the oxidation catalyst comprises an admixture of tin vanadate, molybdenum oxide and titanium oxide.

3. The process according to claim 1 wherein the oxidation catalyst is molybdenum trioxide.

4. The process according to claim 1 wherein the oxidation catalyst is molybdenum disulfide.

5. The process according to claim 1 wherein the oxidation catalyst is tin vanadate.

6. The process according to claim 1 wherein the oxidation catalyst is vanadium oxide.

7. A process which comprises subjecting a hydrocarbon feed selected from the group consisting of mono-alkyl and mono-alkenyl substituted cyclohexene, the mono-alkyl and mono-alkenyl substituents containing from 1 to 6 carbon atoms, in admixture with oxygen in the range of 1 to 100 volumes of oxygen per gaseous volume of said hydrocarbon feed, to contact with a catalyst comprising an admixture of tin vanadate, molybdenum oxide, and titanium oxide at a temperature in the range from about 400 F. to about 1000 F. and recovering benzoic acid as a reaction product.

8. The process according to claim 7 wherein the hydrocarbon feed comprises 4-vinyl-1-cyclohexene.

9. The process according to claim 7 wherein the hydrocarbon feed comprises 4-ethyl-1-cyclohexene.

10. The process according to claim 7 wherein the hydrocarbon feed comprises 2-propyl-1-cyclohexene.

11. The process according to claim 7 wherein the hydrocarbon feed comprises 2-methyl-1-cyclohexene.

12. The process according to claim 7 wherein the hydrocarbon feed comprises 4-butyl-1-cyclohexene.

13. A process for the conversion of hydrocarbons to benzoic acid which comprises subjecting a hydrocarbon feed selected from the group consisting of mono-alkyl and mono-alkenyl substituted cyclohexenes, wherein the substituent contains from 1 to 6 carbon atoms to contact with a catalyst selected from the group consisting of molybdenum trioxide, molybdenum disulfide, tin vanadate, vanadium pentoxide, mixtures thereof, and an admixture of tin vanadate, molybdenum oxide and titanium oxide at a temperature in the range of 400 F. to 1000 F. with sufficient oxygen to effect conversion of the hydrocarbon feed and recovering benzoic acid as a reaction product.

---

[1] The catalyst was prepared by admixing the following:
18.0 grams of tin vanadate
100 grams of molybdenum oxide
50 grams of titanium oxide
50 grams of oxalic acid
500 cc. of silica gel
500 cc. of water This mixture was evaporated to dryness with stirring and was ignited in the catalyst tube in a stream of air at a temperature of 1200° F. The final volume of catalyst, as indicated, was above 500 cc.

References Cited in the file of this patent

UNITED STATES PATENTS

| | | |
|---|---|---|
| 1,284,887 | Gibbs | Nov. 12, 1918 |
| 1,916,923 | Forrest et al. | July 4, 1933 |
| 2,260,409 | Slotterbeck et al. | Oct. 28, 1941 |
| 2,302,465 | Palmer et al. | Nov. 17, 1942 |
| 2,393,240 | Dreyfus | Jan. 22, 1946 |
| 2,474,334 | Schmidl | June 28, 1949 |
| 2,486,934 | Erchak | Nov. 1, 1949 |

OTHER REFERENCES

Corson et al.: J. A. C. S. 61, pp. 1056–1057 (1939).
Plate et al.: British Chem. Abstr. AII, page 14 (1947).
Linstead et al.: Nature 169, page 100 (1952).